US008748769B2

(12) United States Patent
Allen et al.

(10) Patent No.: US 8,748,769 B2
(45) Date of Patent: Jun. 10, 2014

(54) STACKING ASSEMBLY FOR A MAILPIECE SORTER

(71) Applicant: Pitney Bowes Inc, Stamford, CT (US)

(72) Inventors: Robert J. Allen, Shelton, CT (US); Thomas M. Lyga, Southbury, CT (US); David Purcell, New Milford, CT (US); Brad A. Swinford, New Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 13/659,766

(22) Filed: Oct. 24, 2012

(65) Prior Publication Data

US 2014/0110312 A1 Apr. 24, 2014

(51) Int. Cl.
*G06K 9/00* (2006.01)

(52) U.S. Cl.
USPC ........... 209/584; 209/583; 209/900; 271/220; 271/303

(58) Field of Classification Search
USPC ................... 209/583, 584, 900; 271/220, 303
See application file for complete search history.

(56) References Cited

U.S. PATENT DOCUMENTS

| | | | | |
|---|---|---|---|---|
| 5,109,987 | A * | 5/1992 | Daboub et al. | 209/657 |
| 2005/0056575 | A1 * | 3/2005 | Lee | 209/586 |
| 2005/0056991 | A1 * | 3/2005 | Sullivan | 271/265.01 |
| 2007/0252323 | A1 * | 11/2007 | Mandel | 271/203 |

* cited by examiner

*Primary Examiner* — Jeffrey Shapiro

(74) *Attorney, Agent, or Firm* — Michael J. Cummings; Charles R. Malandra, Jr.; Steven J. Shapiro

(57) ABSTRACT

A divert assembly is described for a mailpiece sorter operative to sort mailpieces into one of a plurality of sortation bins. The divert assembly comprising a re-direct mechanism for selectively re-directing mailpieces travelling along a feed path into the sortation bin and causing each selected mailpiece to be re-directed at an angle relative to the stack of mailpieces to be accumulated in the sortation bin. The divert assembly also including a stacking assembly including a Leading Edge (LE) urge roller, a support blade, and a Trailing Edge (TE) alignment device. The LE urge roller accepts and urges each of the selected mailpieces toward a sidewall of the sortation bin while the support blade holds each of the selected mailpieces between the urge roller and the support blade and in an on-edge parallel relationship relative thereto. The support blade is moveably mounted relative to the LE urge roller to allow the accumulation of additional mailpieces between the LE urge roller and the support blade. The TE alignment device includes a stepper motor rotationally driving a cam about a rotational axis. The cam defines a surface operative to urge the trailing edge portion of each selected mailpiece toward the support blade and into alignment with the stack.

12 Claims, 8 Drawing Sheets

STACKING ASSEMBLY FOR A MAILPIECE SORTER

TECHNICAL FIELD

This invention relates to an apparatus for sorting sheet material and more particularly to a stacking assembly for a sortation module which reliably diverts and stack mailpieces without damage to/jamming of mailpieces as they enter and accumulate in a sortation bin.

BACKGROUND ART

Automated equipment is typically employed in industry to process, print and sort sheet material for use in manufacture, fabrication and mailstream operations. One such device to which the present invention is directed is a mailpiece sorter which sorts mail into various bins or trays for delivery.

Mailpiece sorters are often employed by service providers, including delivery agents, e.g., the United States Postal Service USPS, entities which specialize in mailpiece fabrication, and/or companies providing sortation services in accordance with the Mailpiece Manifest System (MMS). Regarding the latter, most postal authorities offer large discounts to mailers willing to organize/group mail into batches or trays having a common destination. Typically, discounts are available for batches/trays containing a minimum of two hundred (200) or so mailpieces.

The sorting equipment organizes large quantities of mail destined for delivery to a multiplicity of destinations, e.g., countries, regions, states, towns and/or postal codes, into smaller, more manageable, trays or bins of mail for delivery to a common destination. For example, one sorting process may organize mail into bins corresponding to various regions of the U.S., e.g., northeast, southeast, mid-west, southwest and northwest regions, i.e., outbound mail. Subsequently, mail destined for each region may be sorted into bins corresponding to the various states of a particular region e.g., bins corresponding to New York, New Jersey, Pennsylvania, Connecticut, Massachusetts, Rhode Island, Vermont, New Hampshire and Maine, sometimes referred to as inbound mail. Yet another sort may organize the mail destined for a particular state into the various postal codes within the respective state, i.e., a sort to route or delivery sequence.

The efficacy and speed of a mailpiece sorter is generally a function of the number of sortation sequences or passes required to be performed. Further, the number of passes will generally depend upon the diversity/quantity of mail to be sorted and the number of sortation bins available. At one end of the spectrum, a mailpiece sorter having four thousand (4,000) sorting bins or trays can sort a batch of mail having four thousand possible destinations, e.g., postal codes, in a single pass. Of course, a mailpiece sorter of this size is purely theoretical, inasmuch as such a large number of sortation bins is not practical in view of the total space required to house such a sorter. At the other end of the spectrum, a mailpiece sorter having as few as eight (8) sortation bins (i.e., using a RADIX sorting algorithm), may require as many as five (5) passes though the sortation equipment to sort the same batch of mail i.e., mail to be delivered to four thousand (4,000) potential postal codes. The number of required passes through the sorter may be evaluated by solving for P in equation (1.0) below:

$$p^{(\#\ of\ Bins)} = \#\ of\ Destinations \tag{1.0}$$

In view of the foregoing, a service provider typically weighs the technical and business options in connection with the purchase and/or operation of the mailpiece sortation equipment. On one hand, a service provider may opt to employ a large mailpiece sorter, e.g., a sorter having one hundred (100) or more bins, to minimize the number of passes required by the sortation equipment. On the other hand, a service provider may opt to employ a substantially smaller mailpiece sorter e.g., a sorter having sixteen (16) or fewer bins, knowing that multiple passes and, consequently, additional time/labor will be required to sort the mail.

As sortation equipment has been made smaller to accommodate the physical limitations of available space, the throughput requirements must increase to enable an operator to perform multiple sortation passes, i.e., to satisfy the RADIX sorting algorithm discussed in the preceding paragraph. As the throughput requirements increase, the speed of operation increases commensurately which can increase the frequency of jams or damage to mailpieces as they are diverted from a high speed feed path to one of the sortation bins. Damage can occur when a mailpiece comes to an abrupt stop or remains in contact with a high speed belt or continuously operating roller. With respect to the latter, mailpieces can be abraded when a mailpiece sits at rest while a roller or belt of an ingestion assembly continues to drive.

Various attempts have been made to control the divert/stacking function and configure the sortation bin such that a jams and damage are mitigated when a mailpiece is collected/accumulated in a sortation bin. In Stephens et al. U.S. Pat. No. 4,903,956, a divert/stacking assembly includes rotating arm which is driven about an axis which is substantially orthogonal to the feed path and in-plane with sheet material at it travels, on-edge, along the feed path. Once the leading edge of the sheet material comes to rest against a registration stop, the arm is activated to urge the trailing edge of the sheet material into the bin, thereby causing the edges of the accumulated sheets to be in register and each of the sheets to be parallel. While systems such as that described in the "956, patent improve the general alignment of sheets within a sortation bin, such divert/stacking assemblies do not account for variable forces which may be required to divert such sheet material or sheet material which may vary in weight or thickness. Furthermore, as the rotating arms or urge rollers continue to operate, such divert/stacking assemblies can damage the sheet material.

A need, therefore, exists for a stacking assembly which aligns sheet material, e.g., a mailpiece, in a sortation bin while mitigating jams and damage to the sheet material

BRIEF DESCRIPTION OF THE DRAWINGS

The accompanying drawings illustrate presently preferred embodiments of the invention and, together with the detailed description given below, serve to explain the principles of the invention. As shown throughout the drawings, like reference numerals designate like or corresponding parts.

SUMMARY OF THE INVENTION

A divert assembly is described for a mailpiece sorter operative to sort mailpieces into one of a plurality of sortation bins. The divert assembly comprising a re-direct mechanism for selectively re-directing mailpieces travelling along a feed path into the sortation bin and causing each selected mailpiece to be re-directed at an angle relative to the stack of mailpieces to be accumulated in the sortation bin. The divert assembly also including a stacking assembly including a Leading Edge (LE) urge roller, a support blade, and a Trailing Edge (TE) alignment device. The LE urge roller accepts and urges each of the selected mailpieces toward a sidewall of the sortation bin while the support blade holds each of the selected mailpieces between the urge roller and the support blade and in an on-edge parallel relationship relative thereto. The support blade is moveably mounted relative to the LE urge roller to allow the accumulation of additional mailpieces between the LE urge roller and the support blade. The TE alignment device includes a stepper motor rotationally driving a cam about a rotational axis. The cam defines a surface operative to urge the trailing edge portion of each selected mailpiece toward the support blade and into alignment with the stack.

DETAILED DESCRIPTION OF THE INVENTION

The present invention relates to a new and useful divert/stacking assembly for a sortation device. The divert/stacking assembly is described in the context of a multi-tiered sortation device, however, the invention is equally applicable to any sheet material sorter, e.g., linear, back-to-back, or tiered. The sheet material being sorted is commonly a finished mailpiece, however other sheet material is contemplated, such as the content material used in the fabrication of mailpieces, i.e., in a mailpiece inserter. In the context used herein, “mailpiece” means any sheet material, sheet stock (postcard), envelope, magazine, folder, parcel, or package, which is substantially “flat” in two dimensions.

Figure 1:
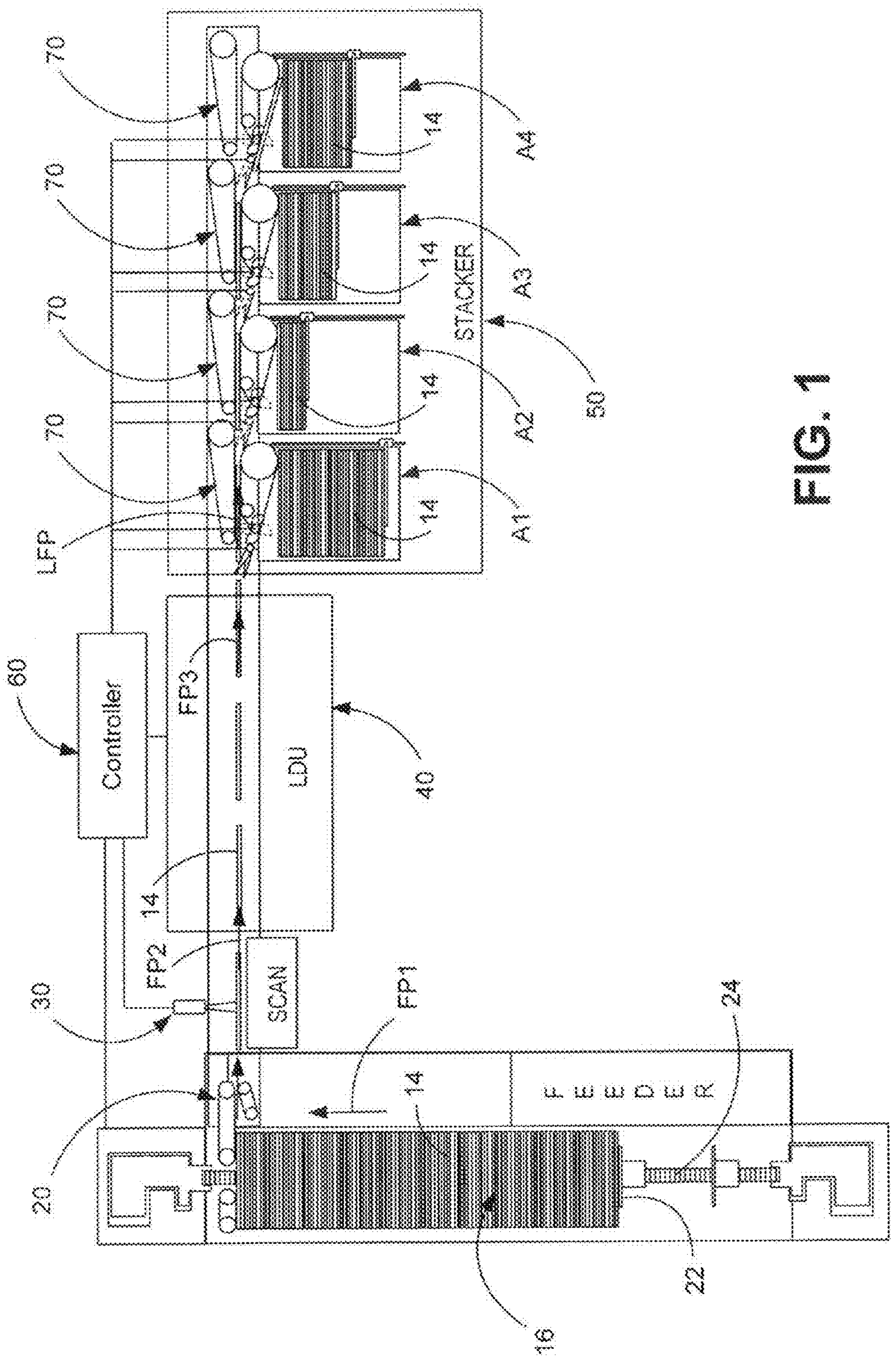
FIG. 1 is a top view of a mailpiece sorter including a multi-tier stacker according to the present invention for receiving and sorting mailpieces into a plurality of sortation bins.

In FIG. 1, a plurality of mailpieces are fed, scanned and sorted by a multi-tiered sorting system 10. Before discussing the various processing functions, it will be useful to become familiar with the physical arrangement of the various modules. The principle modules of the multi-tiered sorting system 10 include: a sheet feeding apparatus 16, a scanner 30, a Level Distribution Unit (LDU) 40, a multi-tiered stacker/sorter 50, and a controller 60. With respect to the latter, the overall operation of the multi-tiered stacker/sorter 10 is coordinated, monitored and controlled by the system controller 60. While the sorting system 10 is described and illustrated as being controlled by a single system processor/controller 60, it should be appreciated that each of the modules 16, 30, 40 and 50 may be individually controlled by one or more processors. Hence, the system controller 60 may also be viewed being controlled by one or more individual microprocessors.

The sheet feeding apparatus 16 accepts a stack of mailpieces 14 between a plurality of singulating belts 20 at one end and a support blade 22 at the other end. The support blade 22 holds the mailpieces 14 in an on-edge, parallel relationship while a central conveyance belt 24 moves the support blade 22, and consequently, the stack of mailpieces 14, toward the singulation belts 24 in the direction of arrow FP.

Once singulated, the mailpieces 14 are conveyed on-edge, in a direction orthogonal to the original feed path FP of the mailpiece stack. That is, each mailpiece 14 is fed in an on-edge lengthwise orientation across or passed a scanner 30 which identifies and reads specific information on the mailpiece 14 for sorting each mailpiece 14 into a sortation bin 80 (discussed hereinafter when describing the multi-tiered sorter 50). Generally, the scanner 30 reads the postal or ZIP code information to begin the RADIX sorting algorithm discussed in the Background of the Invention section of the present application. The scanner 30 may also be used to identify the type of mailpiece/parcel, e.g., as a postcard, magazine, which may be indicative of the weight or size of the mailpiece 14 being sorted.

Figure 2:
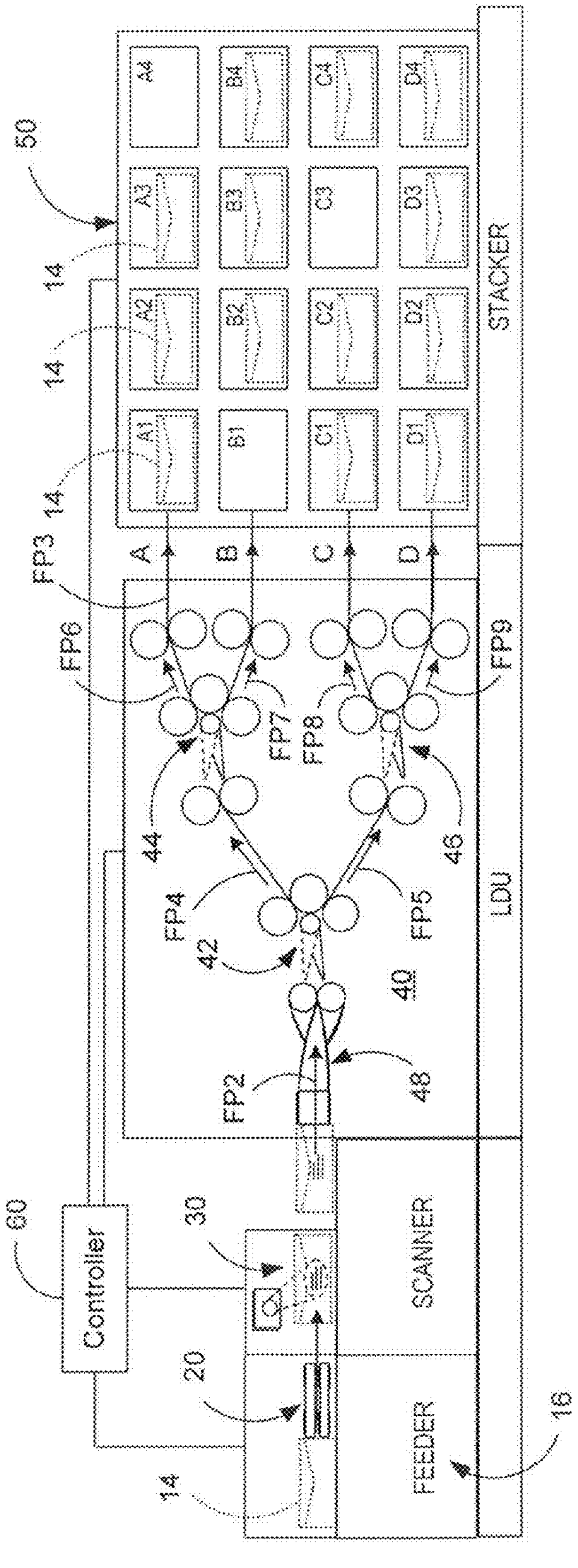
FIG. 2 is a side view of the mailpiece sorter shown in FIG. 1 including a feeder, a scanner, and a linear distribution unit for feeding the multi-tiered stacker.

Following the scanning operation, each mailpiece 14 is conveyed to the Level Distribution Unit (LDU) wherein, each mailpiece 14 is routed via a series of diverting flaps/vanes 42, 44, 46, to the appropriate level or tier A, B, C or D of the multi-tiered sorter. The level A, B, C or D is determined by the controller 60, based upon the information obtained by the scanner 30. For example, if a mailpiece is destined for bin C3 (see FIG. 2), the LDU 40 routes a mailpiece 14 to level C by diverting the input feed path $FP_O$, to the lower feed path FP2, of two feed paths FP1, FP2. The mailpiece 14 is then routed to the upper feed path FP5 of the two lower feed paths FP5, FP6 to arrive at level C. It should be appreciated that the LDU may handle and route mailpieces 14 in a variety ways to distribute mailpieces from an input feed path FP to an output feed path $FP_O$, including the use of conventional nip rollers, spiral elastomeric rollers, opposing belts, etc. Furthermore, the orientation may be inverted from an on-edge to a horizontal orientation by a conventional twisted pair of opposing belts 48 shown at the input of the LDU 40 and/or visa versa to reverse the orientation, i.e., from a horizontal to an on-edge orientation (not shown) by the same type of inverting mechanism.

In the described embodiment, each mailpiece 14 leaves the LDU 40 in an on-edge orientation and transported to a linear feed path LFP (see FIG. 1) on each level A, B, C, or D of the multi-tiered stacker/sorter 50. Each linear feed path LFP is defined by a plurality of back-to-back belt drive mechanisms (discussed in greater detail below when discussing the components of the divert/stacking assembly of the present invention) which convey the mailpieces 14 to one of several sortation bins A1-A4, B1-B4, C1-C4, D1-D4, on each level of the stacker/sorter 50. While the linear feed path LFP, may be defined by dedicated belt drive mechanisms, the present invention employs elements of an inventive divert/stacking assembly 70 to convey the mailpieces along the linear feed path LFP.

Figure 3:
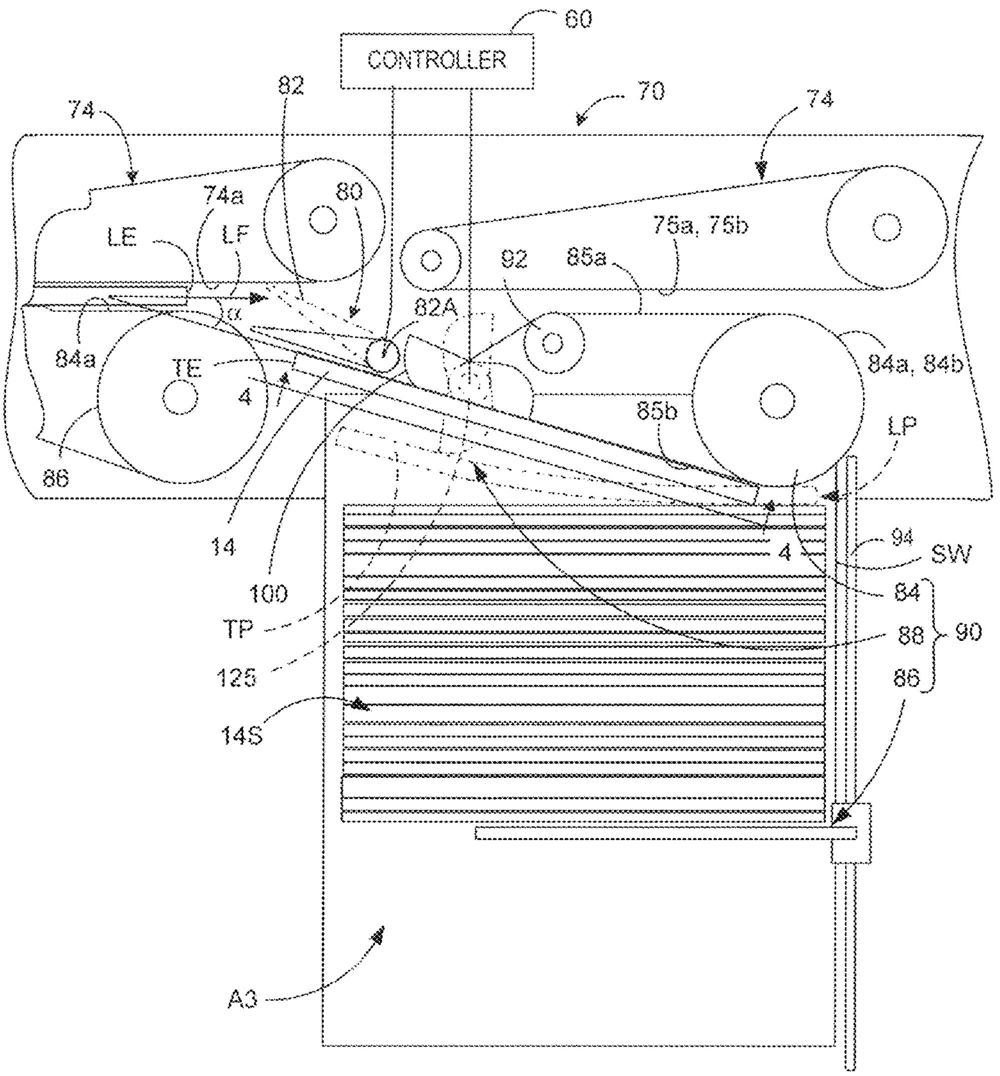
FIG. 3 depicts an enlarged top view of a divert/stacking assembly including a re-direct assembly and an ingestion assembly operative to divert mailpieces from a high speed feed path and stack mailpieces on-edge into each of the sortation bins of the multi-tiered stacker.

In FIG. 3, the divert/stacking assembly 70 of the present invention includes a re-direct mechanism 80 and a stacking assembly 90 to accumulate and stack mailpieces 14 into sortation bin A3. More specifically, the re-direct mechanism 80 is operative to selectively re-direct mailpieces 14 into sortation bin A3 by interrupting the linear motion thereof and diverting the selected mailpieces an angle α relative to the linear feed path LFP. This may be accomplished by understanding that the entire sorting system 10 is equipped with sensors. e.g., photocells, encoders, to monitor the instantaneous location of any mailpiece 14 at any time along the various feed paths, including the location of the predetermined gaps between the trailing edge TE of one mailpiece 14 and the leading edge LE of a subsequent mailpiece.

In the described embodiment, the re-direct mechanism 80 includes a conventional divert vane 82 and an actuator (not shown) operative to pivot the vane 82 about an axis 82A into the feed path LPF of selected mailpieces 14. While the re-direct mechanism 80 employs a pivotable vane 82 to divert select mailpieces 82, any mechanism which interrupts the linear motion of the selected mailpieces 14 and diverts the same at an angle may be employed.

Figure 4:
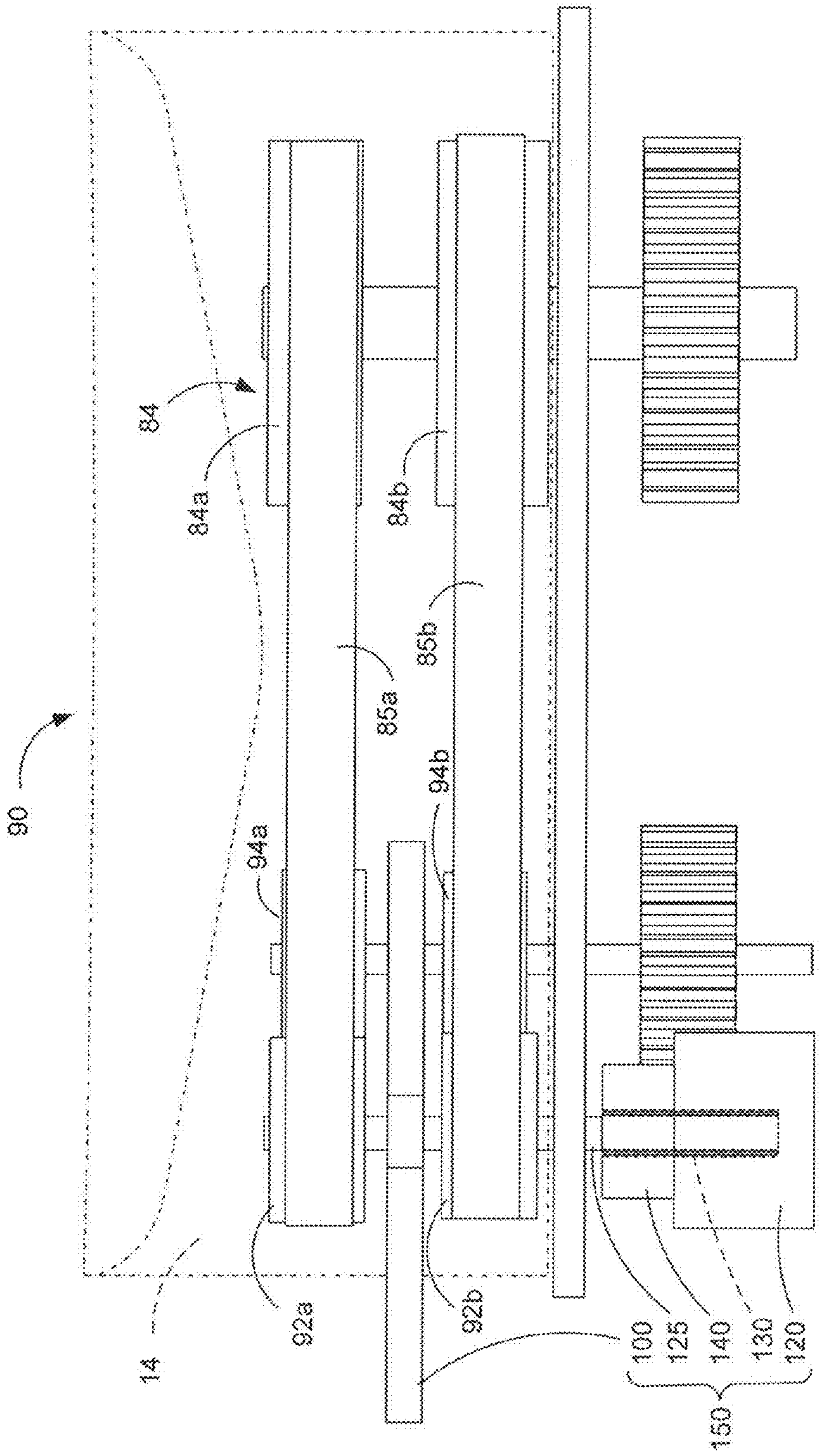
FIG. 4 depicts a broken away side view of the divert/stacking assembly taken substantially along line 4-4 of FIG. 3 including a digital rotary positioning device and a dual-lobed cam for driving the trailing edge of a mailpiece into parallel alignment with a spring-biased support blade of the stacking assembly.

In FIGS. 3 and 4, the stacking assembly 90 includes a Leading Edge (LE) urge roller 84, a support blade 86 and a Trailing Edge (TE) alignment device 88. The LE urge roller 84 is operative to accept each of the selected mailpieces 14 and urge a leading edge portion LP thereof toward a sidewall 94 of the sortation bin A3. In the described embodiment, the urge roller 84 includes a pair of urge rollers 84*a*, 84*b* (see FIG. 4) which cooperate with a pair of drive belts 85*a*, 85*b* and a pair of upstream rollers 92*a*, 92*b* to drive selected mailpieces 14 into the bin A3 on one side thereof. Additionally, the pair of drive belts 84*a*, 84*b* wrap around a pair of divert rollers 94*a*, 94*b* to drive other mailpieces 14, e.g., non-selected mailpieces 14, along the linear feed path LPF on the other side thereof. More specifically, the drive belts 85*a*, 85*b* cooperate with an opposing linear conveyance drive assembly 74 to capture and drive non-selected mailpieces 14 to another sortation bin A4 downstream of sortation bin A3.

Figure 5:
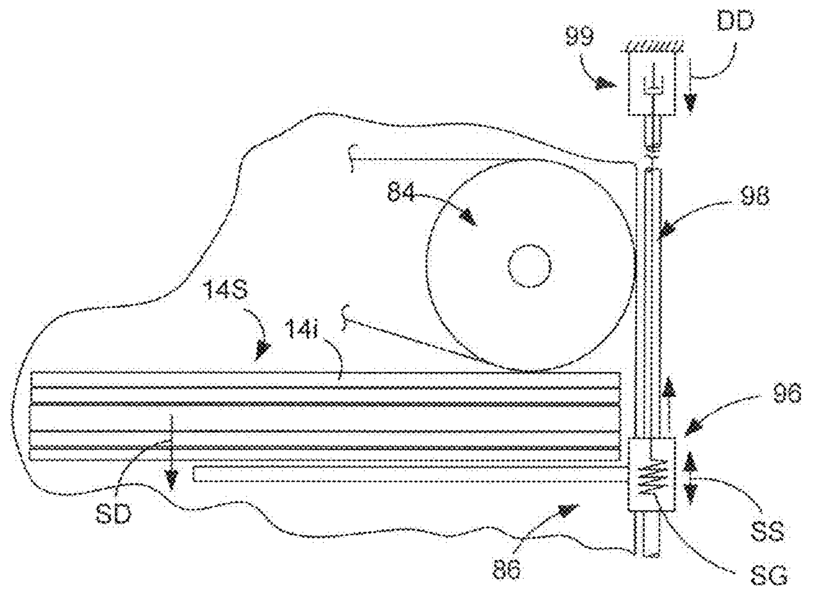
FIG. 5 depicts an enlarged broken away view of the sortation bin including the support blade and its mounting arrangement relative to the ingestion assembly.

In FIGS. 3 and 5, the support blade 86 is operative to hold the selected mailpieces 14 in an on-edge parallel orientation against the urge roller 84. More specifically, the support blade 86 is disposed in a plane which is substantially parallel to the linear feed path LFP and orthogonal to the stack direction, i.e., in the direction of arrow SD, of the selected mailpieces 14. In the described embodiment, the stacking assembly 90 includes a guide rod assembly 96 for mounting the support blade 86 relative to the urge roller 84. More specifically, the guide rod assembly 96 includes a linear bearing 97 for moveably mounting the support blade 86 along a guide rod 98 toward or away from the urge roller 84 in the direction of arrow SS. In the described embodiment, the linear bearing assembly 97 and support blade 86 are spring-biased toward the urge roller 84 such that without a stack of selected mailpieces 14, the support blade 86 rests against the respective urge roller 84.

In the preferred embodiment, the stacking assembly 90 includes a damping assembly 99 operative to damp the motion of the support blade 86 in the direction of arrow DD. That is, when the support blade moves outwardly, away from the urge roller 84, the motion of the support blade 86 is damped. More specifically, low acceleration movement of the support blade 86 is dominated by the spring while a high acceleration motion of the support blade 86 is dominated by the damper 99. The import of this arrangement will be discussed in greater detail hereinafter when discussing the operation of the divert/stacking assembly 70 of the present invention.

Figure 6:
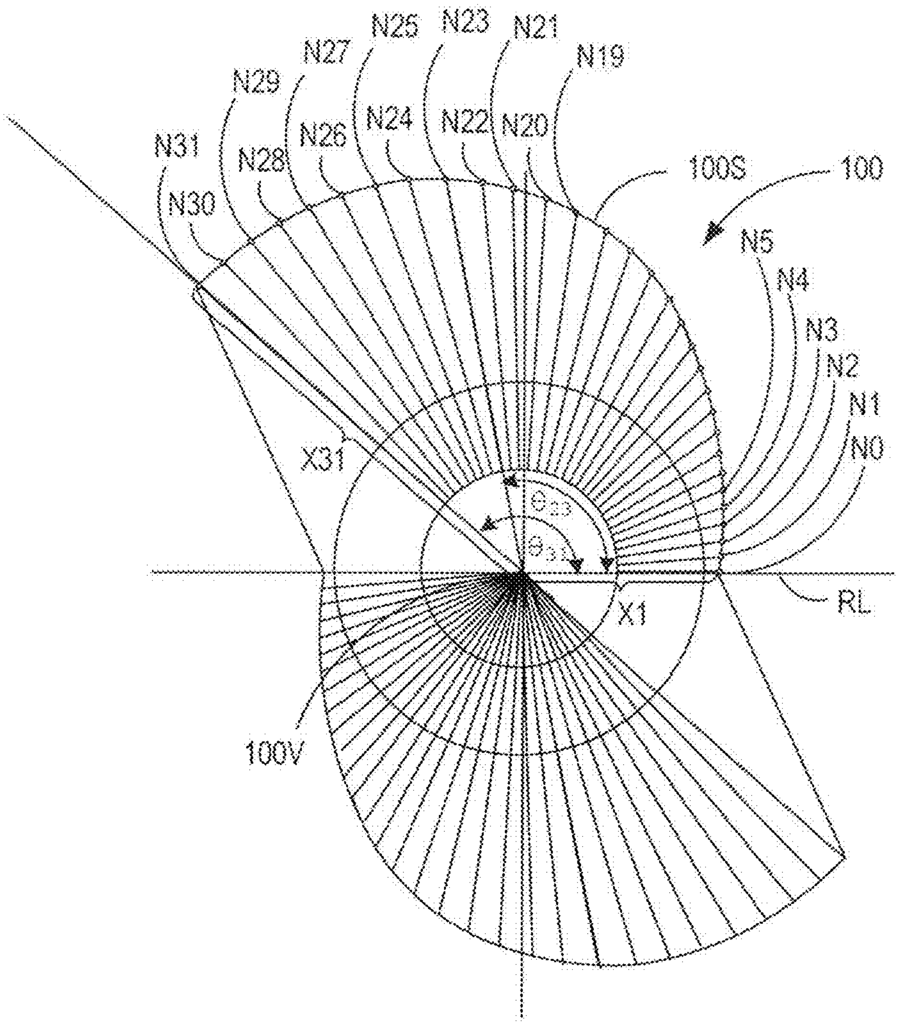
FIG. 6 depicts the dual-lobed cam including the locus of points describing the contour of the cam surface.

In FIGS. 3, 4 and 6, the trailing edge (TE) alignment device 88 includes a first or dual-lobed beater cam 100 driven about an axis of rotation by a digital rotary positioning device or stepper motor 120 (see FIG. 6). With respect to the latter, the stepper motor 120 is a NEMA 17 frame motor. The inventors discovered through extensive research and inventive insight that integration of a low cost stepper motor 120 would require a precise cam profile 100S capable of maintaining the necessary "holding torque" to drive the trailing edge TP of the selected mailpieces 14 into alignment. They determined that due to the torque limitations of conventional stepper motors a novel cam profile 100S would be required to prevent motor stall.

The cam profile 100S is best described by reference to a table which identifies the locus of points N0-N31 about a common vertex 100V, each of the points N0-N31 being disposed on a radial line a distance X1-X31 from the vertex 100V, and at an angle θ from a line of reference RL. The table defines cam profile in terms of the radial distance X as a function of the angle θ from zero (0°) degrees to one-hundred and forty degrees (140°). The radial distance X (Column IV) is measured from the vertex 100V of each point N0-N31 (Column I) on the surface of the cam. Furthermore, the radial distance X (Column IV) changes from one point to the next by the rise distance (Column III). The angle θ (Column II) is measured from a line of reference RL.

TABLE I

| Point No. | Angle (θ) | Rise (in) | Total Displacement (X − in) |
|---|---|---|---|
| 1 | 0.00 | 0.000 | 0.538 |
| 2 | 4.65 | 0.002 | 0.540 |
| 3 | 9.33 | 0.006 | 0.544 |
| 4 | 14.000 | 0.014 | 0.552 |
| 5 | 18.667 | 0.025 | 0.563 |
| 6 | 23.333 | 0.039 | 0.577 |
| 7 | 28.000 | 0.056 | 0.594 |
| 8 | 32.667 | 0.076 | 0.614 |
| 9 | 37.333 | 0.097 | 0.635 |
| 10 | 42.000 | 0.121 | 0.659 |
| 11 | 46.667 | 0.147 | 0.685 |
| 12 | 51.333 | 0.174 | 0.712 |
| 13 | 56.000 | 0.203 | 0.741 |
| 14 | 60.667 | 0.233 | 0.771 |
| 15 | 65.333 | 0.263 | 0.801 |
| 16 | 70.000 | 0.294 | 0.832 |
| 17 | 74.667 | 0.325 | 0.863 |
| 18 | 79.333 | 0.355 | 0.893 |
| 19 | 84.000 | 0.385 | 0.923 |
| 20 | 88.667 | 0.414 | 0.952 |
| 21 | 93.333 | 0.441 | 0.979 |
| 22 | 98.000 | 0.467 | 1.005 |
| 23 | 102.667 | 0.491 | 1.029 |
| 24 | 107.333 | 0.512 | 1.050 |
| 25 | 112.000 | 0.532 | 1.070 |
| 26 | 116.667 | 0.549 | 1.087 |
| 27 | 121.333 | 0.563 | 1.101 |
| 28 | 126.000 | 0.574 | 1.112 |
| 29 | 130.667 | 0.582 | 1.120 |
| 30 | 135.333 | 0.586 | 1.124 |
| 31 | 140.000 | 0.588 | 1.126 |

The cam profile may also be defined by the relationship given in equation 1.0 below.

$$R(\theta) = R_T/2\times(1-\mathrm{COS}(\Pi\times\theta/\theta_T)) \quad (1.0)$$

wherein θ is an angle from a line of reference RL, wherein R(θ) is a rise height (in inches) at each angle θ, wherein RT is a total rise height (in inches), and wherein $\theta_T$ is a total angle inscribed by the cam surface 100S.

Figure 7:
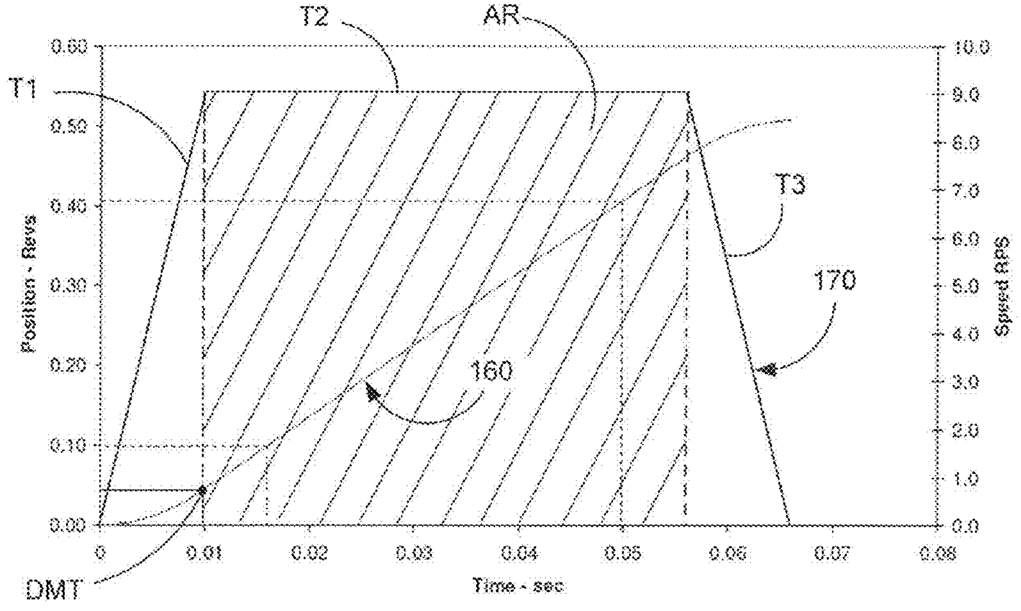
FIG. 7 depicts the rotational position and velocity curves for driving the digital rotary positioning device as a function of time.

In the described embodiment, the dual-lobed cam 100 is mounted to and rotates with a shaft 125 which is driven by a digital rotary positioning device or stepper motor. In the preferred embodiment, stepper motor is a NEMA 17 Frame bi-polar motor having two-hundred (200) steps, each step corresponding to about 1.8 degrees. FIG. 7 illustrates the control motion profile including a substantially linear rotational position curve 160 and a trapezoidal rotational velocity curve 170. From the position curve 160, it will be appreciated that the stepper motor 120 consumes about 0.0655 seconds to travel 0.5 revolutions or one-hundred eighty degrees (180°). From the rotational velocity curve 170, it will be appreciated that a maximum rotational speed of 9.0 revolutions per second is achieved during a single cycle. The time required to accelerate from a standing position to the maximum rotational speed (i.e., the left-hand sloping portions T1, T3 of the curve 170) is about 0.010 seconds. Furthermore, the time over which a constant speed is maintained (the horizontal portion T2 of the curve 170) is about 0.0456 seconds. The number of degrees travelled until the motor reaches the maximum speed is about 0.0450 revolutions which is about sixteen degrees (16°) and the number of degrees travelled while the velocity is constant is about 0.410 revolutions or about sixty-five degrees (65°). These values are summarized in Table II below

TABLE II

| | |
|---|---|
| Max Speed | 9 revolutions/second |
| Cycle Time | 0.0655 second |
| Stoke | 0.5 revolutions |
| T1 = T3 | 0.010 seconds |
| T2 | 0.0456 seconds |
| Acceleration Distance | 0.04475 revolutions |
| Acceleration Rate | 905 revolutions/second$^2$ |
| Constant Velocity Distance | 0.410 revolutions |

In operation, and returning to FIG. 3, mailpieces 14 are conveyed along the linear feed path LFP between the belts 84*a*, 84*b* of the ingestion assembly, i.e., the outboard side thereof, and the belts 75*a*, 75*b* of the linear conveyance assembly 74. When a selected mailpiece, i.e., a mailpiece 14 identified by the scanner 30 to be stacked in a particular one of the sortation bins A1-D4, the re-direct assembly 80 receives a signal from the controller 60 to divert a selected mailpiece 14 into the sortation bin, i.e., sortation bin A3 in FIG. 3. The selected mailpiece 14 is initially re-directed at an angle α while the leading edge alignment device 84, i.e., the urge rollers 84*a*, 84*b* in combination with the drive belts 85*a*, 85*b*, urge the leading edge portion LP (shown in phantom lines in FIG. 3) of a selected mailpiece 14 toward a sidewall portion of the sortation bin A3. The controller 60 then issues a signal to the trailing edge alignment device 88, i.e. the dual-lobed cam 100 and digital rotary positioning device 120, to rotate approximately one-hundred and forty degrees (140°) to urge the trailing edge portion TP into parallel alignment with the support blade 86 or the previously stacked mailpieces 14.

As each mailpiece 14 is stacked, support blade 86 moves away from the urge roller 84 under the normal forces imposed by the stack 14S while the spring SS retains the blade 86 in contact with the outboard end of the stack 14S. Should a particularly heavy, i.e., large inertial mass, mailpiece 14 be stacked into the sortation bin A3, the damping assembly (see FIG. 5) prevents the blade 86 from momentarily disengaging the stack 14S with the attendant loss of stacking control. That is, it will be appreciated that a large impact load may be imposed on the stack by a high velocity mailpiece, or one which is larger/heavier than can be handled by the spring SS without accelerating the support blade outwardly, even under the load imposed by the spring. The damper assembly, therefore, mitigates the propensity for disengagement and the potential for misalignment, or jamming of, mailpieces in the stack 14S.

Figure 8:
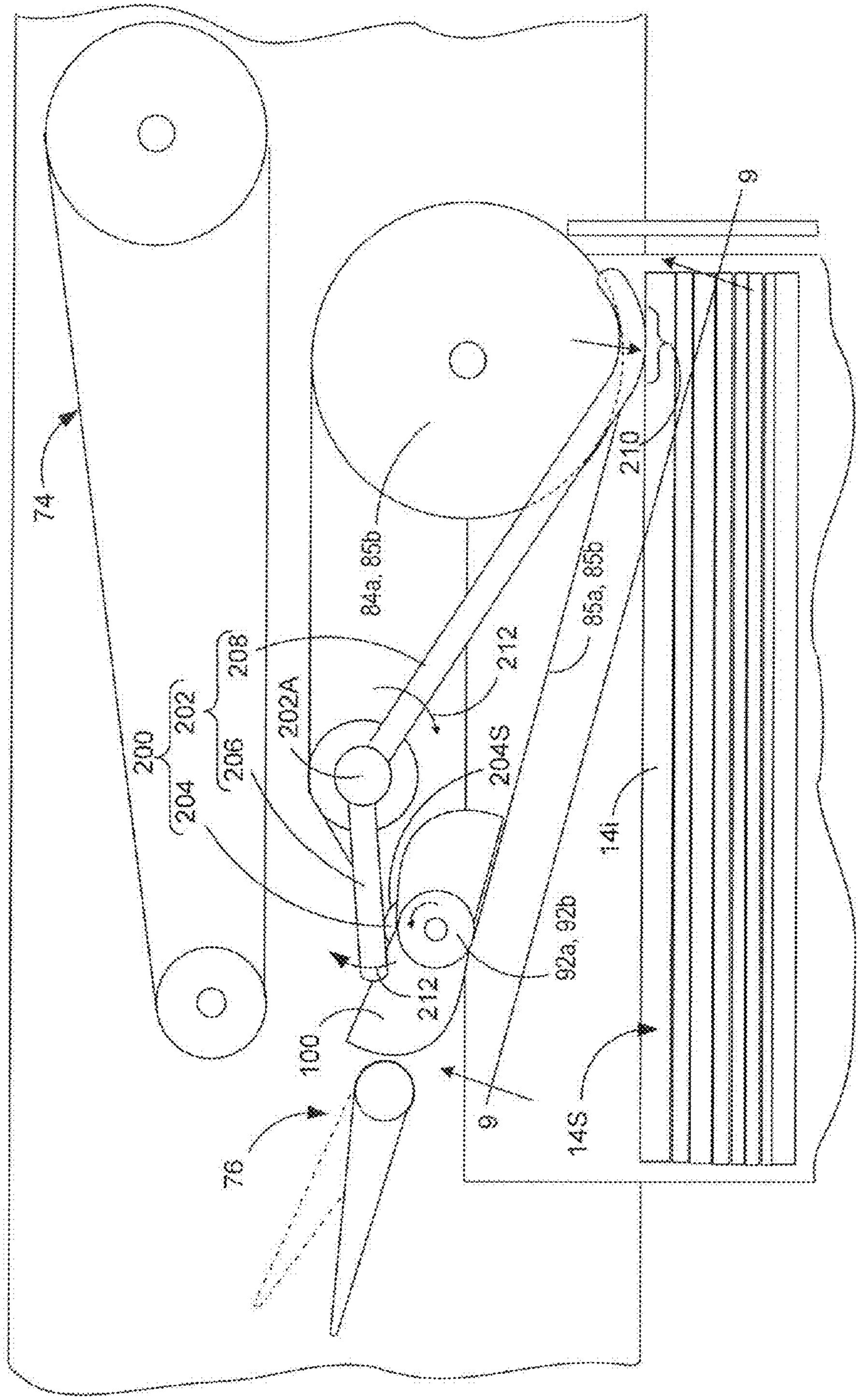
FIG. 8 depicts an alternate embodiment of the present invention wherein a second cam is operative to pivot a bellcrank arm into contact with a face surface of a stacked mailpiece to separate the mailpiece from contact with a drive belt or roller of the ingestion assembly.
Figure 9:
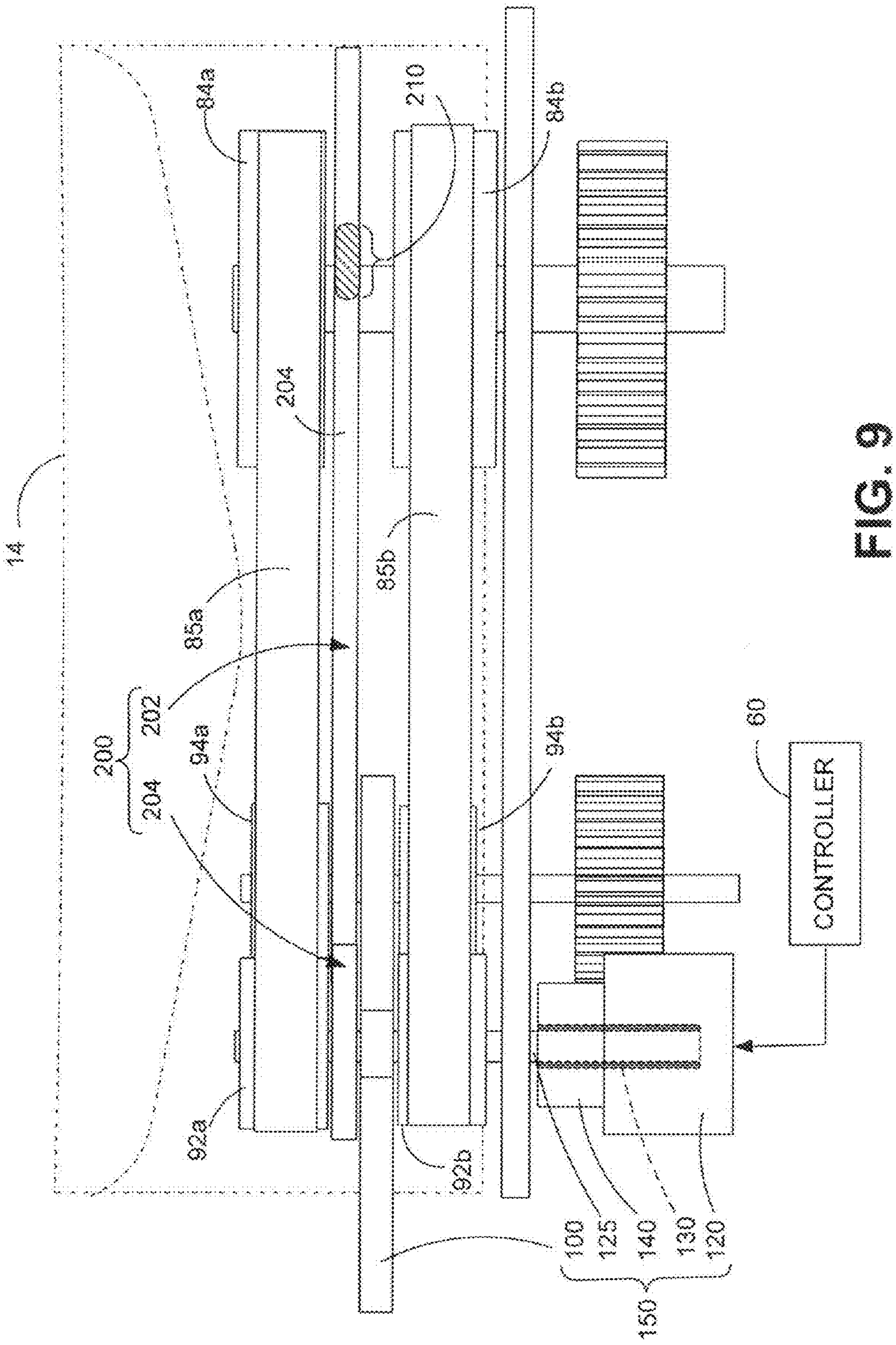
FIG. 9 is a sectional view taken substantially along line 9-9 of FIG. 8 wherein the first and second cams are disposed on, and driven by, the shaft of the stepper motor.

In FIGS. 8 and 9 another embodiment of the invention is depicted wherein an anti-abrasion assembly 200 is employed in combination with the ingestion assembly 90 to protect stacked mailpieces from damage due to abrasion. More specifically, the anti-abrasion assembly 200 allows the continuous operation of the ingestion assembly 90, i.e., the urge rollers 84*a*, 84*b* and drive belts 85*a*, 84*b*, without incurring abrasion to a surface of the stacked mailpieces 14S. That is, to the extent that the support blade 86 is spring-loaded in a direction tending to trap the stack of mailpieces 14S against the urge rollers 84*a*, 84*b* and drive belts 85*a*, 85*b*, it will be appreciated that the continuous movement thereof can result in damage to the affected mailpiece, the innermost mailpiece 14*i* being spring-loaded against the moving elements of the ingestion assembly 90.

In this embodiment, the inventors recognized a synergistic use of the digital rotary positioning device 120 of the Trailing Edge alignment device 88 for control in combination with an anti-abrasion device 200. More specifically, the inventors recognized that inasmuch as the positioning device 120 has the ability for precise positioning control, including reverse control, an opportunity arises to employ this motion to disengage the stack during certain operational modes. i.e., an idle mode when mailpieces are not being stacked or accumulated into a particular sortation bin.

In the broadest sense of this embodiment, the anti-abrasion assembly 200 includes anti-abrasion linkage 202 responsive to rotation of the digital rotary positioning device 120 to forcibly displace a surface 210 of the stacked mailpieces 14 away from a moving surface of the ingestion assembly 84.

In the described embodiment, the anti-abrasion assembly 200 includes the anti-abrasion link 202 and a second cam 204 disposed about and rotating with the shaft 125 of the stepper motor 120. The anti-abrasion linkage 202 is pivotally mounted about support axis 202A which is disposed between the urge rollers 84*a*, 84*b* of the leading edge alignment assembly 84 and the drive rollers 92*a*, 92*b* of the trailing edge alignment device 88. The linkage 202 includes an input arm 206 operative to contact a lobed cam surface 204S of the second cam 204 and an output arm 208 a operative to contact the innermost mailpiece 14*i* of the stack of mailpieces 14S. Upon rotating the shaft 125 of the stepper motor 120, the input arm 204 follows the cam surface 204S which causes the linkage 202 to rotate in the direction of arrow 212. Furthermore, inasmuch as the linkage 202 is configured as a bellcrank or lever, rotation of the input arm 206 also effects rotation of the output arm 208 toward the innermost mailpiece 14*i* of the stack 14S.

In operation, the first or dual-lobed cam 100 rotates in approximately one-hundred and eighty degree (180°) increments, and minimally one-hundred and forty degree (140°) degree increments, to urge the trailing edge portion of the selected mailpieces. While in an idle condition, i.e., when mailpieces 14 are not being diverted or selected into the sortation bin, the second cam 204 imparts a rotary motion to the anti-abrasion linkage 202, i.e., about the rotational axis 212, such that the output arm 208 separates, or effects a gap between, the innermost mailpiece 14*i* of the stack 14S and the urge roller 84*a*, 84*b* and the drive belts 85*a*, 85*b*. Inasmuch as it may be undesirable to cyclically move the anti-abrasion linkage 202 with each revolution of the stepper motor shaft 125, the second cam 204 may be clutch mounted (not shown) to the drive shaft 125. More specifically, the clutch mount may be of an overrunning-type such that when the shaft 125 rotates in one direction, i.e. the direction for rotating and activating the dual-lobed cam 100, the second cam 204 is disengaged. However, when rotated in the opposite direction, the over-running clutch mount engages the second cam 204 to impart motion to the anti-abrasion linkage 202.

In summary, divert/stacking assembly employs a low cost, controllable, and highly accurate positioning device to drive a dual lobed cam for aligning mailpieces in a sortation bin. The dual lobed cam includes an optimum surface contour or profile to minimize torque on the shaft without inducing a stall condition in the positioning device.

Furthermore, the invention describes an embodiment wherein the positioning device is also used to prevent abrasion of mailpieces while sitting idle awaiting additional mailpieces to be stacked in the sortation bin.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A divert assembly for a mailpiece sorter operative to sort mailpieces into one of a plurality of sortation bins, the divert assembly comprising:

a re-direct mechanism for selectively re-directing mailpieces travelling along a feed path into the sortation bin and causing each selected mailpiece to be re-directed at an angle relative to the stack of mailpieces to be accumulated; and a stacking assembly including a Leading Edge (LE) urge roller, a support blade and a Trailing Edge (TE) alignment device, the LE urge roller operative to accept each of the selected mailpieces from the re-direct mechanism and urge a leading edge portion thereof toward a sidewall of the sortation bin, the support blade operative to hold the mailpieces in an on-edge parallel orientation against the urge roller and being moveably mounted relative thereto, and the TE alignment device including a first cam driven about a rotational axis by a digital rotary positioning device, the cam defining a surface operative to urge the trailing edge portion of each selected mailpiece toward the support blade and into alignment with the stack;

a controller operatively coupled to the re-direct mechanism and stacking assembly for stacking mailpieces into a sortation bin; and wherein the cam surface is defined by the relationship:

$$R(\theta) = R_T/2 \times (1 - \mathrm{COS}(\Pi \times \theta/\theta_T))$$

wherein θ is an angle from a line of reference wherein R(θ) is a rise height (in inches) at each angle θ;

wherein RT is a total rise height (in inches)

wherein $\theta_T$ is a total angle inscribed.

2. The divert assembly according to claim 1 wherein the digital rotary positioning device is a stepper motor.

3. The divert assembly according to claim 1 wherein the TE alignment device includes a rotary encoder operative to detect the rotational position of the cam about the rotational axis.

4. The divert assembly according to claim 2 wherein the cam is driven by a shaft, the shaft driven by the stepper motor through an elastomeric coupling operative to isolate vibratory oscillations imposed on the cam by impact with the stacked mailpieces.

5. The divert assembly according to claim 1 wherein the cam is dual lobed.

6. The divert assembly according to claim 1 wherein the cam surface is further defined by a locus of points N about a common vertex, each point N being disposed on a radial line a distance X from the vertex, and at the angle θ from the line of reference; the cam surface being further defined by the relationship described in the following table:

| Point No. | Angle θ | Total Displacement (X − inches) |
|---|---|---|
| 1 | 0.00 | 0.538 |
| 2 | 4.66 | 0.540 |
| 3 | 9.33 | 0.544 |
| 4 | 14.000 | 0.552 |
| 5 | 18.667 | 0.563 |
| 6 | 23.333 | 0.577 |
| 7 | 28.000 | 0.594 |
| 8 | 32.667 | 0.614 |
| 9 | 37.333 | 0.635 |
| 10 | 42.000 | 0.659 |
| 11 | 46.667 | 0.685 |
| 12 | 51.333 | 0.712 |
| 13 | 56.000 | 0.741 |
| 14 | 60.667 | 0.771 |
| 15 | 65.333 | 0.801 |
| 16 | 70.000 | 0.832 |
| 17 | 74.667 | 0.863 |
| 18 | 79.333 | 0.893 |
| 19 | 84.000 | 0.923 |
| 20 | 88.667 | 0.952 |
| 21 | 93.333 | 0.979 |
| 22 | 98.000 | 1.005 |
| 23 | 102.667 | 1.029 |
| 24 | 107.333 | 1.050 |
| 25 | 112.000 | 1.070 |
| 26 | 116.667 | 1.087 |
| 27 | 121.333 | 1.101 |
| 28 | 126.000 | 1.112 |
| 29 | 130.667 | 1.120 |
| 30 | 135.333 | 1.124 |
| 31 | 140.000 | 1.126. |

7. A mailpiece sorting assembly, comprising:

a feeder module for feeding and singulating mailpieces from a stack of mailpieces, each mailpiece being fed along a feed path in a first on-edge orientation;

a scanner for reading information contained on each of the mailpieces, and issuing electronic data useful for grouping the mailpieces for delivery;

a stacker/sorter having a plurality of sortation bins, each sortation bin having a stacking assembly including: a Leading Edge (LE) urge roller, a support blade and a Trailing Edge (TE) alignment device, the LE urge roller operative to accept each of the selected mailpieces from the re-direct mechanism and urge a leading edge portion thereof toward a sidewall of the sortation bin, the support blade operative to hold the mailpieces in an on-edge parallel orientation against the urge roller and being moveably mounted relative thereto, and the TE alignment device including a first cam driven about a rotational axis by a digital rotary positioning device, the cam defining a surface operative to urge the trailing edge portion of each selected mail-piece toward the support blade and into alignment with the stack; and a controller operatively coupled to the feeder, scanner and stacker/sorter for sorting mailpieces in to one of the sortation bins; and wherein the cam surface is defined by the relationship:

$$R(\theta) = R_T / 2 \times (1 - \mathrm{COS}(\Pi \times \theta / \theta_T)$$

wherein θ is an angle from a line of reference wherein R(θ) is a rise height (in inches) at each angle θ;

wherein RT is a total rise height (in inches)

wherein $\theta_T$ is a total angle inscribed.

8. The mailpiece sorting assembly according to claim 7 wherein the digital rotary positioning device is a stepper motor.

9. The mailpiece sorting assembly according to claim 8 wherein the TE alignment device includes a rotary encoder operative to detect the rotational position of the cam about the rotational axis.

10. The mailpiece sorting assembly according to claim 9 wherein the cam is driven by a shaft, the shaft driven by the stepper motor through an elastomeric coupling operative to isolate vibratory oscillations imposed on the cam by impact with the stacked mailpieces.

11. The mailpiece sorting assembly according to claim 8 wherein the cam is dual lobed.

12. The mailpiece sorting assembly according to claim 8 wherein the cam surface is further defined by a locus of points N about a common vertex, each point N being disposed on a radial line a distance X from the vertex, and at the angle θ from the line of reference; the cam surface being further defined by the relationship described in the following table:

| Point No. | Angle θ | Total Displacement (X – inches) |
|---|---|---|
| 1 | 0.00 | 0.538 |
| 2 | 4.66 | 0.540 |
| 3 | 9.33 | 0.544 |
| 4 | 14.000 | 0.552 |
| 5 | 18.667 | 0.563 |
| 6 | 23.333 | 0.577 |
| 7 | 28.000 | 0.594 |
| 8 | 32.667 | 0.614 |
| 9 | 37.333 | 0.635 |
| 10 | 42.000 | 0.659 |
| 11 | 46.667 | 0.685 |
| 12 | 51.333 | 0.712 |
| 13 | 56.000 | 0.741 |
| 14 | 60.667 | 0.771 |
| 15 | 65.333 | 0.801 |
| 16 | 70.000 | 0.832 |
| 17 | 74.667 | 0.863 |
| 18 | 79.333 | 0.893 |
| 19 | 84.000 | 0.923 |
| 20 | 88.667 | 0.952 |
| 21 | 93.333 | 0.979 |
| 22 | 98.000 | 1.005 |
| 23 | 102.667 | 1.029 |
| 24 | 107.333 | 1.050 |
| 25 | 112.000 | 1.070 |
| 26 | 116.667 | 1.087 |
| 27 | 121.333 | 1.101 |
| 28 | 126.000 | 1.112 |
| 29 | 130.667 | 1.120 |
| 30 | 135.333 | 1.124 |
| 31 | 140.000 | 1.126. |

* * * * *